US012744725B2

(12) United States Patent
Yahya

(10) Patent No.: US 12,744,725 B2
(45) Date of Patent: Sep. 22, 2026

(54) COHERENT INTERNET NETWORK BONDING SYSTEM

(71) Applicant: Petroliam Nasional Berhad (PETRONAS), Kuala Lumpur (MY)

(72) Inventor: Mazlaini Bin Yahya, Kuala Lumpur (MY)

(73) Assignee: Petroliam Nasional Berhad (PETRONAS), Kuala Lumpur (MY)

( * ) Notice: Subject to any disclaimer, the term of this patent is extended or adjusted under 35 U.S.C. 154(b) by 89 days.

(21) Appl. No.: 18/859,503

(22) PCT Filed: Aug. 30, 2022

(86) PCT No.: PCT/MY2022/050080
§ 371 (c)(1),
(2) Date: Oct. 23, 2024

(87) PCT Pub. No.: WO2023/163581
PCT Pub. Date: Aug. 31, 2023

(65) Prior Publication Data

US 2025/0106142 A1 Mar. 27, 2025

(30) Foreign Application Priority Data

Feb. 23, 2022 (MY) ............................ PI2022001027

(51) Int. Cl.
*H04L 45/00* (2022.01)
*H04L 41/0893* (2022.01)
*H04L 45/12* (2022.01)
*H04L 45/121* (2022.01)
*H04L 45/302* (2022.01)
*H04L 45/74* (2022.01)

(52) U.S. Cl.
CPC .......... *H04L 45/124* (2013.01); *H04L 45/121* (2013.01); *H04L 45/20* (2013.01)

(58) Field of Classification Search
CPC ..... H04L 45/124; H04L 45/121; H04L 45/20; H04L 45/00; H04L 45/74; H04L 45/302; H04L 41/0893
USPC .......................................................... 709/238
See application file for complete search history.

(56) References Cited

U.S. PATENT DOCUMENTS 11,438,265 B2 * 9/2022 Sze ....................... H04L 45/302
2008/0225728 A1 9/2008 Plamondon
(Continued)

FOREIGN PATENT DOCUMENTS

WO 2021022383 A1 2/2021
WO 2023163581 A1 8/2023

OTHER PUBLICATIONS

Foreign Communication from a Related Counterpart Application, International Search Report and Written Opinion dated Dec. 16, 2022, International Application No. PCT/MY2022/050080 filed on Aug. 30, 2022.

*Primary Examiner* — Jude Jean Gilles
(74) *Attorney, Agent, or Firm* — Conley Rose, P.C.

(57) ABSTRACT

The present disclosure relates to a system for coherent internet network bonding comprising at least one source of data packets, at least one destination for the data packets, and the data packets being routed from the at least one source to the at least one destination via one or more channels/paths simultaneously, wherein the condition of the channels/paths are monitored, and utilised depending on their latency, speed and/or quality.

12 Claims, 10 Drawing Sheets

(56) References Cited

U.S. PATENT DOCUMENTS

2008/0232258 A1* 9/2008 Larsson ................ H04L 45/123
370/252
2009/0274131 A1 11/2009 Lee et al.
2012/0287911 A1 11/2012 Takano et al.
2013/0294489 A1 11/2013 Thibeault et al.

* cited by examiner

Coherent Bonding Time = $t_1 + t_2 + t_3 + t_4 = (4 \times t_1)$ > Normal Route $t_1$
Hence Coherent Bonding Routing Speed = 1/4 of Normal Routing Speed (14 + 20 + 20)/1514 = 3.6% overhead processing Serial System Reliability and Failure Parallel System Reliability and Failure

COHERENT INTERNET NETWORK BONDING SYSTEM

CROSS-REFERENCE TO RELATED APPLICATIONS

The present application is a filing under 35 U.S.C. 371 as the National Stage of International Application No. PCT/MY2022/050080, filed Aug. 30, 2022, entitled "COHERENT INTERNET NETWORK BONDING SYSTEM," which claims priority to Malaysian Application No. PI2022001027 filed with the Intellectual Property Office of Malaysia on Feb. 23, 2022, both of which are incorporated herein by reference in their entirety for all purposes.

FIELD OF INVENTION

The invention relates to a system for coherent internet network bonding.

BACKGROUND

Wireless gigabit-speed for backhaul networks is only achievable when the radio channel bandwidth is over 100 MHz from the physical wireless communication device during transmission. Unlicensed and licensed backhaul spectrums below 10 GHz for long haul terrestrial and offshore within or beyond 100 km range are regulated not exceeding 50 MHz radio channel bandwidth and vary with country between 30 MHz to 50 MHz. A gigabit-speed wireless backhaul is always a challenging feat when the regulated bandwidth is small.

An approach to overcome the small regulated radio channel bandwidth of less than 50 MHz is to combine the multiple physical communication channels on a single host device using the combined channel virtualization method to become more than 100 MHz channel bandwidth in total using a virtual domain. It splits, analyzes, and coherently reroutes the data packets to the multiple radio or network channels and internet paths between the internet source and destination end-points of a user that uses the host device that enables coherent internet network bonding. However, the network bonding control between the source end-point at the user side to the internet destination end-point is required to ensure zero packet loss throughout the complete data packet transmission.

When data packets from a user move through multiple channels or paths, the chances of missing and late-arriving data packets to the destination end-points are high when each channel or path has unique latency, performance, and interference. Because of this, internet data packets normally use a single network channel or path to the destination end-points in an orderly sequence to guarantee zero packet loss throughout the complete data packet transmission.

All conventional network bonding methods are typically limited within a controlled intranet domain using two same devices between the two end-points performing some encapsulation and decapsulation methods to track the split data packets to increase throughput. Once in the internet domain, network bonding stops.

An aim of the invention, therefore, is to provide a system that overcomes the above issues.

SUMMARY OF INVENTION

In an aspect of the invention, there is provided a routing device for coherent internet network bonding, comprising:

routing means for routing data packets from at least one source to at least one destination via two or more electronic communication channels and/or paths simultaneously;

characterised by monitoring means for monitoring the condition of the channels and/or paths, and utilising the channels and/or paths depending on their latency, speed, and/or quality.

Thus according to the invention, the routing device controls the selection of multiple internet channels or paths during network bonding between the internet source and destination end-points. Advantageously it also does not need to place a routing device at the internet destination end-point, as this is only required at the user side to achieve both increased throughput and low latency using standard internet network hardware implementation therewith in an agnostic approach. Further advantageously, this solves the problem of increasing the throughput on existing network communication technology and infrastructure, particularly for long-haul terrestrial and offshore communication to achieve gigabit-speed connectivity. It will nevertheless be appreciated that a routing device can be placed at both source and destination endpoints if required.

In one embodiment the routing device is a bonding router. Alternatively, it may be a host device or module.

In one embodiment the routing means is capable of routing data packets from at least one source to at least one destination via one or more electronic communication channels and/or paths. Thus while the routing device can utilise multiple channels and paths, it is also capable of operating more conventionally, using a single channel or path, and/or routing data packets from a single source to a single destination.

In one embodiment an asynchronous bonding method is initiated for both downlink direction and uplink directions.

In one embodiment a channel or path is utilised if the monitoring means determines that the condition thereof is good, and does not utilise it if the monitoring means determines that the condition thereof is bad. Typically a user can set thresholds for latency, speed, and/or quality to allow the monitoring means to determine if the condition of a channel or path is good or bad, and/or dynamically adjust the selection thereof.

Thus when one or more channels/paths becomes slow or unavailable the monitoring means marks them as bad and the routing means reroutes the packets to good channels/paths to ensure continuous and uninterrupted bonding when an application is still running, avoiding the need to stop, pause and resume the same. Similarly, when the functionality of such channels/paths is restored, packets can be rerouted thereto.

In one embodiment the monitoring means automatically detecting active network channels or paths and using the available network channels or paths simultaneously without waiting for a network channel or path to reach its maximum capacity before using another randomly selected network channel or path that is not at capacity. This differentiates the invention further from the conventional aggregational bonding systems.

In one embodiment the routing means selecting the best network configuration to split the data packets and route them over multiple internet channels and paths with zero packet loss using data packet header information from at least one source and/or destination. The initial channel/path selection may be determined by a channel classifier using a fast mathematical algorithm based on source or/and destination end-points data packet header information.

In one embodiment the monitoring means calculates a routing cost based on latency, speed, and/or quality associated with each channel/path to determine an optimal route for data packets. Typically the routing cost for each channel/path is unique or processed thereto.

In one embodiment the monitoring means randomly selecting additional channels/paths for determining if they have lower routing costs than those currently selected for routing.

In one embodiment the channels/paths are bonded between source and destination, typically using wired and/or wireless mediums that are in electronic communication with the intranet and/or internet domain.

In one embodiment cascade connections with other routing devices can be formed, each routing device having at least one physical routing interface, when there are more available channels than the number of physical routing interfaces, to increase the number of bonded channels. Advantageously the asynchronous bonding method thus allows the bonding speed to be increased to the maximum.

In one embodiment the channels/paths include a virtual tunnel via a Virtual Private Network domain. Coherent internet bonding can be performed for Virtual Private Network (VPN) extending beyond the internet domain until the VPN server in which the routing algorithm differentiates between public internet and VPN destination end-points accordingly after VPN information is accessible. Coherent internet bonding can be performed for both public internet and VPN accesses concurrently without disabling either. The VPN server may also be used as an intermediary to complete end-to-end virtual tunnel connectivity between an end-point to another end-point.

In one embodiment a coherent internet network bonding algorithm is conducted on a single routing device to determine the condition of the network channels or paths from its source end-point right until the internet destination end-point, typically in a continuous manner.

The bonded channels/paths retain low latency, high reliability, and high-speed performance when is subjected to channel/path interference over a very long channel/path range beyond 100 km for a single internet routing hop as it can utilise interference mitigation performance of the devices that provide the channel/paths.

In one embodiment the routing device comprises storage means for storing the internet network configuration. Typically the routing device conducts a diagnosis of the status and condition of the internet network configuration to ensure all unwanted network configurations that affect the performance of the coherent bonding are removed before the bonding is performed. The removal is important as the coherent bonding processing domain of the routing device starts at the physical interfaces used for the bonding. The bonding requires a unique and distinct channel or path configuration from the user's physical interface to the multi-channel or -path physical interfaces. Proper network configuration is required to ensure successful coherent bonding captures, marks, tracks, classifies, and routes orderly the data packets. The process requires intensive computing resources. For example, if the hardware has a maximum theoretical routing speed of 10 Gb/s for normal routing operation then the coherent bonding maximum routing speed may be a quarter of that speed at 2.5 Gb/s. This is caused by the sequential processing delay from capturing, marking, tracking, classifying, and rerouting operations of the data packets from the physical interfaces that are continuously coming in and going out from the device. However, in practice, the data transfer speed is unlikely to reach the theoretical routing speed so the impact of the processing is minimal and far outweighed by the increase in speed due to the bonding.

In one embodiment the routing device provides intelligent decisions from the classification of the data packets on the best network configuration to split the data packets, select the channel or path randomly based on the latency, speed, and quality of the channel, and reroute data packets orderly over randomly selected multiple internet channels and paths. Because of this, the split data packet from multiple channels or paths can successfully arrive at the destination end-point in timely order with zero packet loss.

In one embodiment the original header information of the data packet is maintained i.e. not changed by the routing device when either rerouting to channels/paths that must have unique source end-point gateway address information for each channel/path; or when using the network address translation for the first forward routing point.

In one embodiment the routing device determines the optimum channels or paths to minimise latency across multiple network hopping points along the internet transmission paths through channel or path quality. Coherent bonding uses a rerouting mechanism to achieve distributed data packet split hence routing cost quantity is used to reflect the quality of the channel or path. Before rerouting to the channels or paths, every data packet is marked to differentiate whether it is an incoming or outgoing data packet. All marked outgoing data packets are processed in the channel or path classifier of the routing means to assign to a pre-selected specific physical interface attached to the routing device that is associated with the channel or path accordingly. The rerouting of the data packets from one channel or path to another channel or path is based on the routing cost assigned for the next channel or path with the next smallest routing cost when the current channel or path is determined to be at higher latency than the previous routing operation. The channel or path selection is also determined by the end-point information in the data packet header that can be uniquely differentiated in the channel or path classifier processing. In the channel or path classifier, the packet header information with the same configuration will always have the same initial channel or path selection. The coherent rerouting to the other channels or paths is randomly selected based on the weighted routing cost that is unique for each next channel or path and so forth from the initial pre-classified channel or path. The rerouting function receives the resulted internet response from the destination end-point using the standard Transmission Control Protocol (TCP) of the Internet Protocol (IP) method. The channel or path classifier's next channel or path selection is dependent on the processed responses. If the response for the initial selected channel or path is bad, then the channel or path classifier may select another path or channel and so forth.

In one embodiment, the weights for the routing cost for the next channel or path and so forth are dynamically adjusted using the previous channels' or paths' latency and performance from source end-points to the destination end-points performed by the routing device. The weights are obtained using a machine learning algorithm that analyses historical network performance based on factors such as dedicated or shared conditions, fiber-optics, radio frequency or ethernet copper mode, and wired or wireless medium.

In one embodiment the channels or paths are monitored more frequently if the condition thereof is bad or reduced. Thus if the latency or error frequency is high, or the speed is low, the system may check the condition at a higher frequency. But if the condition is good the system may only check the condition at a lower frequency which helps to reduce the rerouting overhead factor. The overhead factor is dependent on the performance of the data packet capturing, marking, classifying, rerouting, destination end-point latency response, combining and data packet splitting and combining, coherent rerouting processing, and routing cost readjustment.

BRIEF DESCRIPTION OF DRAWINGS

It will be convenient to further describe the present invention concerning the accompanying drawings that illustrate possible arrangements of the invention. Other arrangements of the invention are possible, and consequently, the particularity of the accompanying drawings is not to be understood as superseding the generality of the preceding description of the invention.

DETAILED DESCRIPTION

Figure 1:
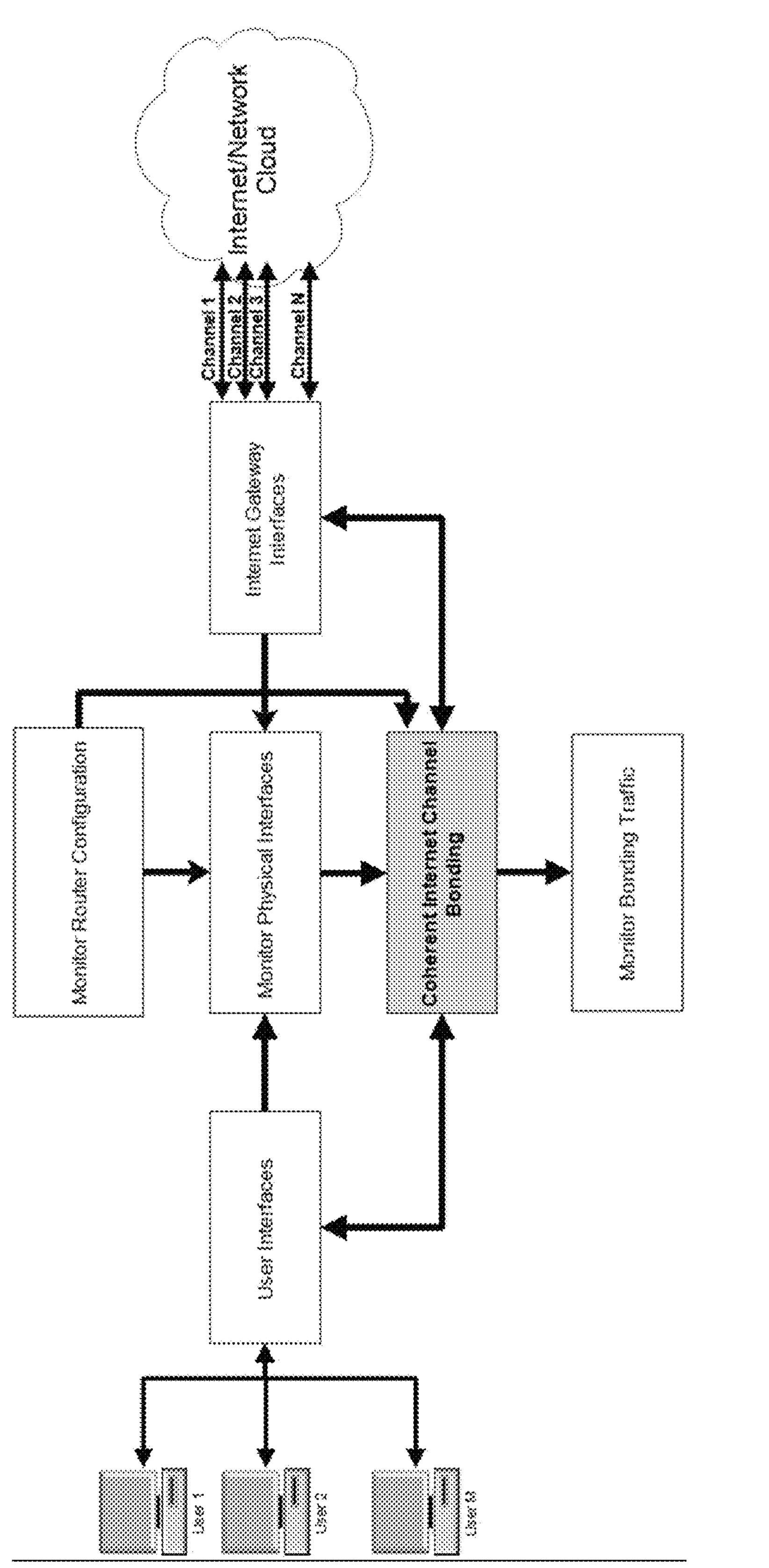
FIG. 1 is a block diagram of the router device with the router and physical interface algorithms to ensure zero interference to the coherent internet channel bonding algorithm.

FIG. 1 is a block diagram of a router device according to the invention, comprising monitoring means for monitoring the physical interfaces (user and internet gateway interfaces), bonding traffic, and router configuration stored in the storage means, and routing means for bonding the internet channels and routing data packets from user devices to the internet via two or more electronic communication channels and/or paths illustrated as channels 1, 2, 3 and N connected to the internet simultaneously depending on the latency, speed and/or quality thereof. It shows the interface functions of the channel bonding processing in the router device comprising the user interfaces, monitor router configuration, monitor physical interface, monitor bonding traffic, and the internet gateway interfaces. The user interfaces are the physical interfaces that connect to user devices. The monitor router configuration provides constant monitoring of the router device configuration for any configuration discrepancies than can disable and affect bonding. The monitor physical interfaces provide constant monitoring of the condition and connectivity status of the physical interfaces to the user devices and the internet gateway channels. The monitor bonding traffic provides constant monitoring of the traffic condition and status of the network channels within and between the router device and the internet connectivity.

Figure 2A:
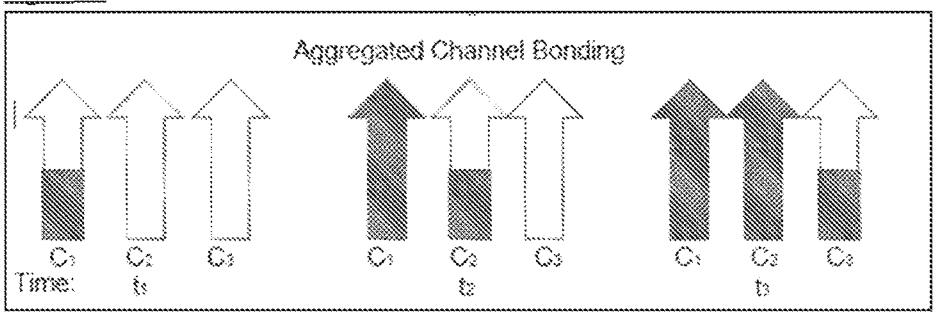
FIG. 2 is a schematic diagram of data packet transmission (a) according to a conventional system, and (b) according to an embodiment of the invention.

With regard to FIG. 2*a*, a typical channel bonding system is indicated concerning time ($t_1$, $t_2$, $t_3$) wherein the master channel $C_1$ is fully utilised before the other channels $C_2$, and $C_3$ are used.

Figure 2B:
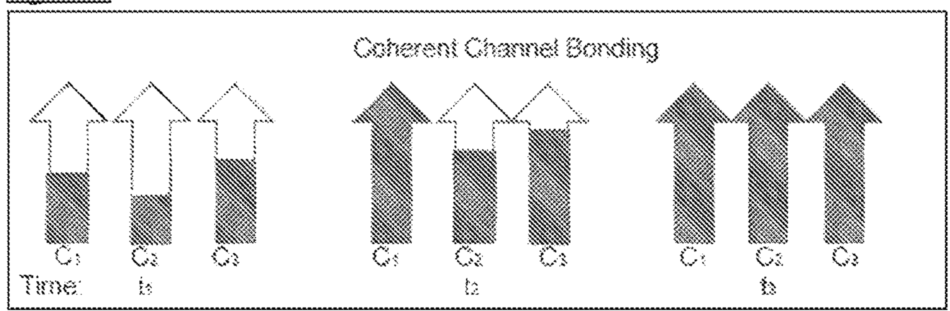

In contrast to this aggregated system, the invention allows all the channels $C_1$, $C_2$, and $C_3$ to be used simultaneously before any of them are at full capacity, as shown in FIG. 2*b*.

Figure 3A:
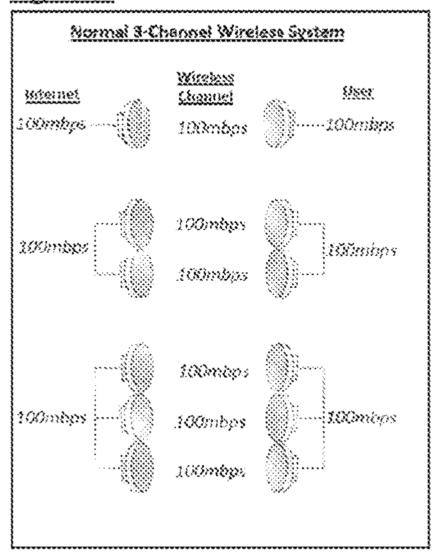
FIG. 3 is a schematic diagram illustrating the user's internet experience (a) according to a conventional system, and (b) according to an embodiment of the invention
Figure 3B:
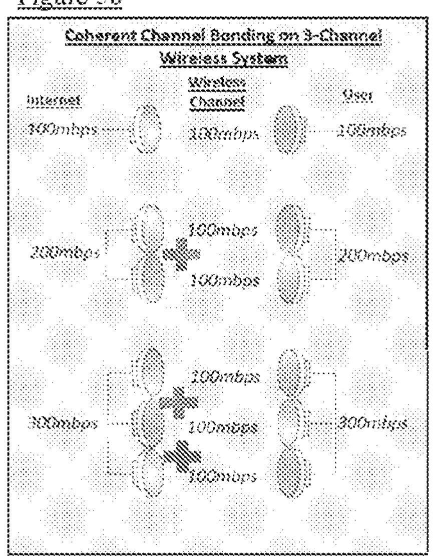

A comparison between a conventional long-range wireless system with a fallback and the long-range wireless system used together with the invention is illustrated in FIGS. 3*a-b*. It can be seen that as a result of using coherent channel bonding, the user experiences close to the combined three-channel throughput of (300 Mbps) without the overhead factoring compared to a normal three-channel wireless system only with a fallback (100 Mbps).

A typical 100 km long-range wireless system is limited on data rate (300 Mbps) on a (30 MHz) regulated transmission bandwidth, has high latency (>10 ms) and low reliability (<95%). High latency in the wireless channel results from the retransmission of the data packet. The packet loss from the previous transmission is affected by the wireless channel interferences. However, in tests the invention with the same setup has already achieved a gigabit data rate using only 4-channel, low latency (<5 ms), and high reliability (>99.999%) of a 4-channel parallel system with channel reliability of (95%). Low latency is achieved when using multiple channels simultaneously that avoids and reduces packet loss to the minimum. Any long-range wireless transmission can be severely affected by high wireless channel interferences, but not all channels will have the same wireless channel interferences severity simultaneously when using multiple channel transmission in a parallel system.

Figure 4:
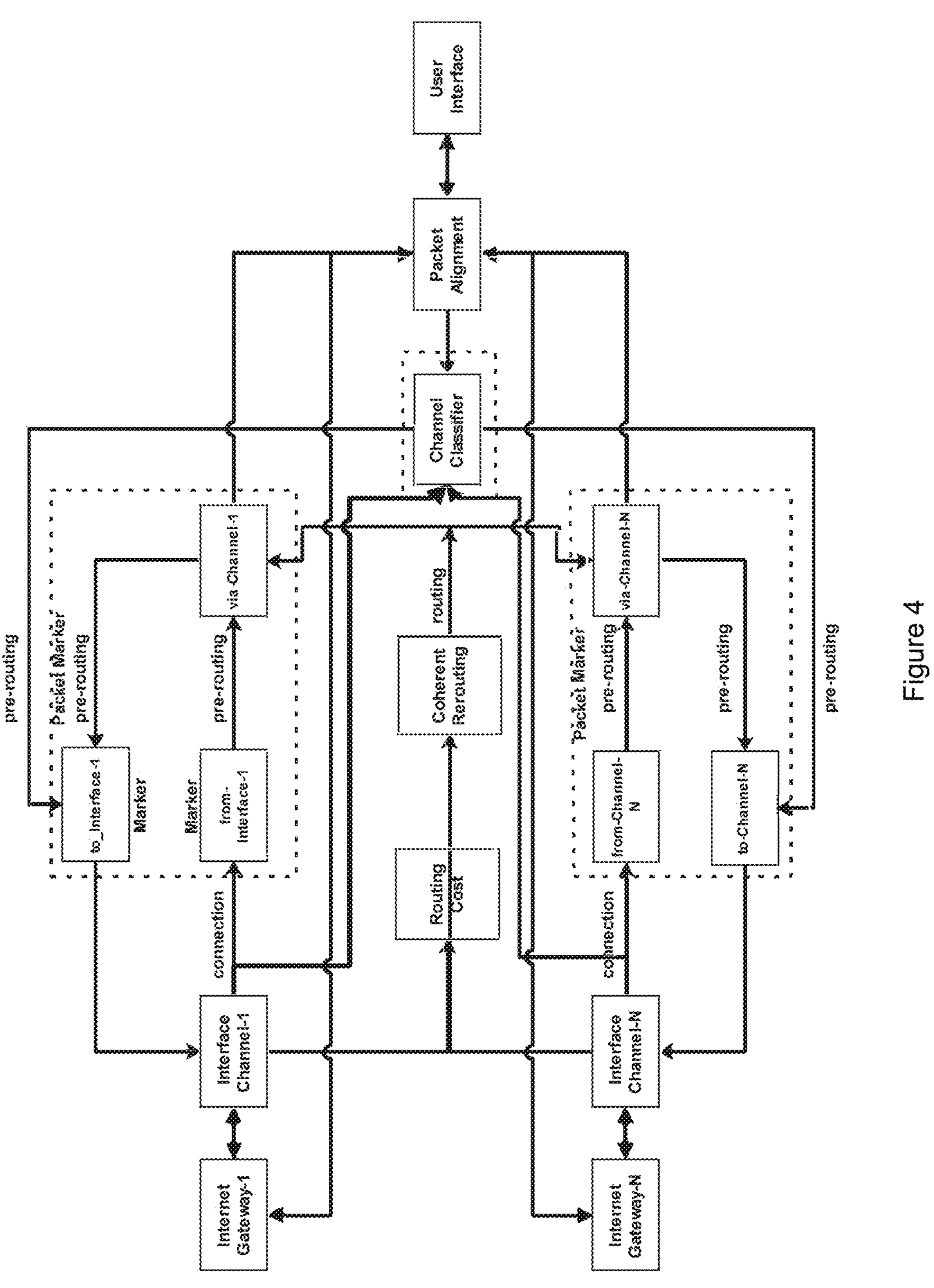
FIG. 4 is a schematic diagram of the coherent internet channel bonding algorithm which routes packets according to the condition of the paths/channels.

With regard to FIG. 4, this result is achieved by monitoring each of the active and available channels and/or paths and utilising them depending on their latency, speed, and quality. The router device can be connected to the user interface (wired and/or wireless) and comprises an algorithm for determining the available channels (wired and/or wireless) for continuously rerouting data packets to a destination.

The algorithm monitors the condition of the channels/paths according to latency, speed, and quality. If the condition of a path or channel is good i.e. low latency, high speed, low error rate, then it can be utilised. If it is bad then it is not used. If the condition of a good path or channel worsens, the monitoring thereof increases in frequency, perhaps from checking 1/1000 or 1/100 to 1/10 packets, and if the condition continues to deteriorate, data packets are continuously rerouted to a different path/channel to avoid packet loss.

The coherent bonding overhead in the invention is quite low, typically 5-10% which compares favourably to aggregational overheads where it is normally around 20-30% when most aggregational bonding uses synchronization and encapsulation/decapsulation bonding mechanism.

Coherent bonding of wired channels has an overhead factor i.e. usable capacity above 95% while for wireless channels with overhead above 90%.

The expected average coherent bonding speed can be calculated as follow: Channel Convergence ($A_{chn}$, $B_{chn}$, $C_{chn}$)=Overhead Factor×($A_{speed}$+$B_{speed}$+$C_{speed}$) e.g. (Wireless-100 Mbps, Wireless-100 Mbps, Wireless-100 Mbps) =0.90×(300 Mbps)=270 Mbps.

Thus increasing internet speed and reducing latency using any available communication network technology and infrastructure is possible when the data packets are configured and rerouted to use multiple internet channels (wired and/or wireless) and paths between the internet source and destination end-points of the access. Data packets uploaded from a user are intelligently split, analyzed, classified, and rerouted to multiple network channels when uploading the data to the internet destination end-point. Data packets can also be downloaded for a user when downloading from the internet destination end-point. The downloaded data packets from multiple network channels are analyzed, classified, combined, and routed to the user network application.

The invention performs the coherent internet network bonding algorithm from a single routing device. It poses a unique feature using the coherency of network bonding that actively uses the available network channels simultaneously without waiting for a network channel to reach its maximum capacity before using another network channel that is not. It analyzes the condition of the network channels and paths right until the internet destination end-point. It also provides intelligent decisions on the best network configuration to split the data packet and properly reroute data packets over multiple internet channels and paths. Each channel is assigned with a routing cost as an example to represent a valid quality value of the channel/path that is dynamically adjusted based on previous latency performance to the destination end-point. A lower routing cost value represents a higher quality of the channel/path.

The system selects which network channels or internet paths to properly upload and download data from the internet destination end-points with a zero transmission packet loss objective. It also achieves low latency across multiple network hopping points along the internet transmission paths using the previous transmission latency performance from the multiple paths to the destination end-points.

In contrast, the conventional network bonding performs bonding synchronization that requires the same bonding devices installed at both internet source and destination end-points. It is suitable for private end-points that are managed by a bonding server residing in the internet cloud. Channel bonding cannot be achieved for public destination end-points without the same device. Hence, it typically limits the network bonding performance within the intranet or virtual private network domain.

Modern applications often require connectivity to the internet cloud and therefore network bonding performance must extend beyond the intranet and virtual private network domain. The invention uses the coherency and asynchronous bonding method ideal for low network latency for long-range multi-hopping and multi-path network points. Asynchronization allows the invention to provide channel bonding from any network end-points, in between routing and hopping points independently. The invention does not modify user data packets. It modifies user data packet paths indirectly by rerouting data packet single routing paths to multiple routing paths. In short, the invention provides a high-performance data packet transport platform that does not modify the contents of the data packet and the packet header. It only provides multiple means of transport to reach the destination with the data packet assignment. It analyzes and reroutes all data packets to the internet paths with the lowest network latency to consistently achieve high throughput from a single routing device. It continuously tests and checks the multiple internet paths to whether it is safe to send the split data packet to reach its destination with complete packet arrangement by minimizing missing or late-arriving packets from different paths due to the long-range packet transmission journey from the source end-point to the in-between internet routing hopping points and the final destination end-point. A retransmitted missing or late-arriving data packet to the internet destination end-point reduces throughput and increases latency. Because of this problem, most conventional network bonding solutions limit their bonding boundary within an intranet or virtual private network domain using the bonding synchronization method.

Figure 5:
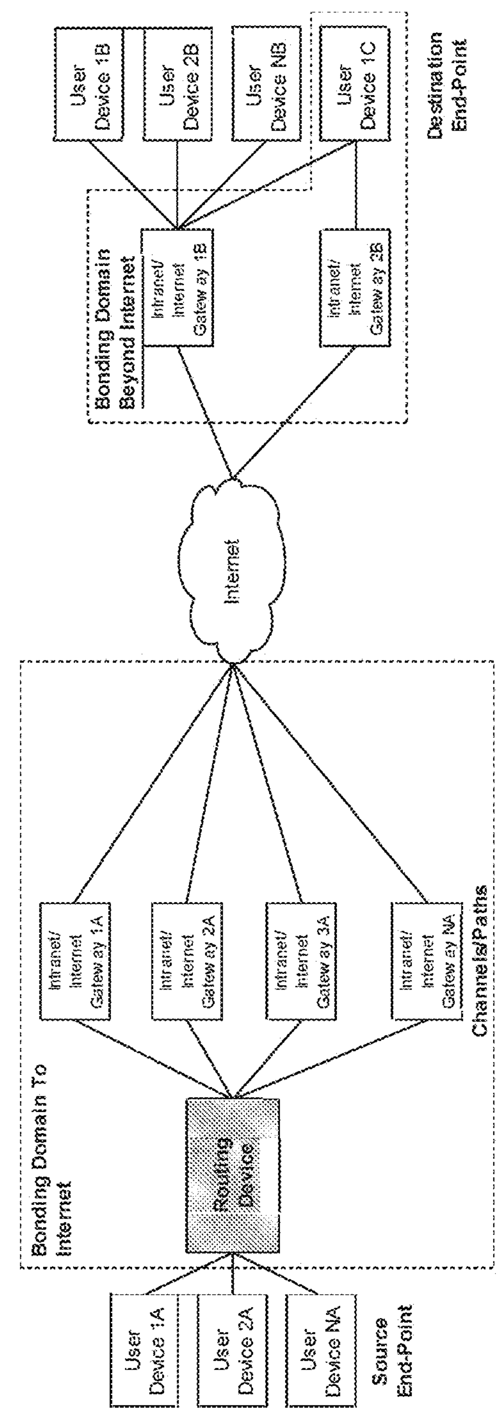
FIG. 5 is a network diagram of the invention's single router device using coherent internet bonding

With regard to FIG. 5, the multi-channel internet bonding boundary starts from the single routing device and extends to the internet domain whenever there exist two or more network paths to the destination end-point. The channel bonding stops at the network point when only a single network path exists up to the destination end-point without any additional similar routing device.

Figure 6:
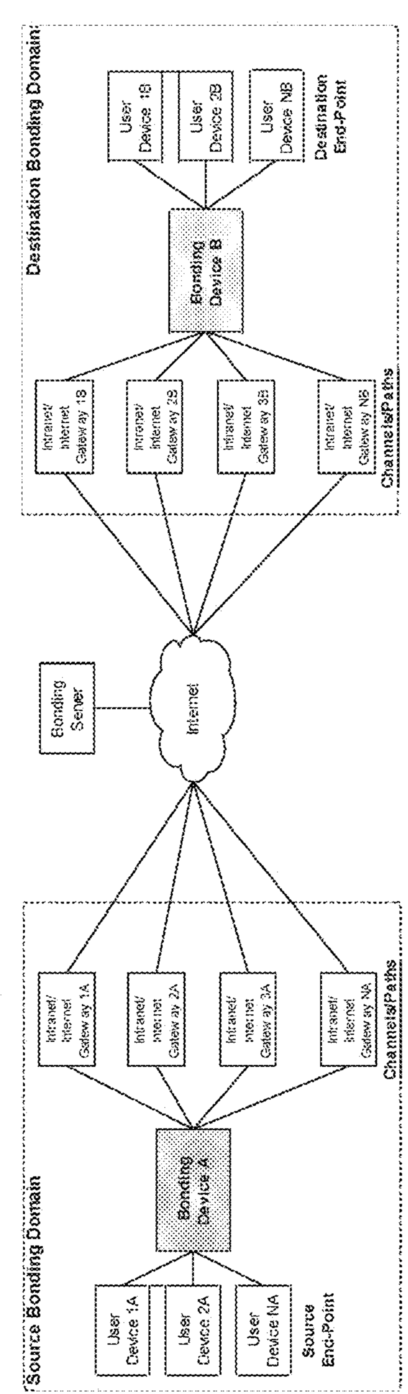
FIG. 6 is a network diagram of conventional internet bonding using a client-bonding server controlling pair; the bonding A domain is beyond the internet

In contrast, in FIG. 6, the conventional aggregated internet bonding requires two equal end-to-end bonding devices between the source and the destination end-points managed by a bonding server. The bonding server controls and establishes the physical channel bonding between the source and destination end-points and the network paths that pass through. Multi-channel internet bonding is only available when both source and destination end-points use equal bonding devices.

Figure 7:
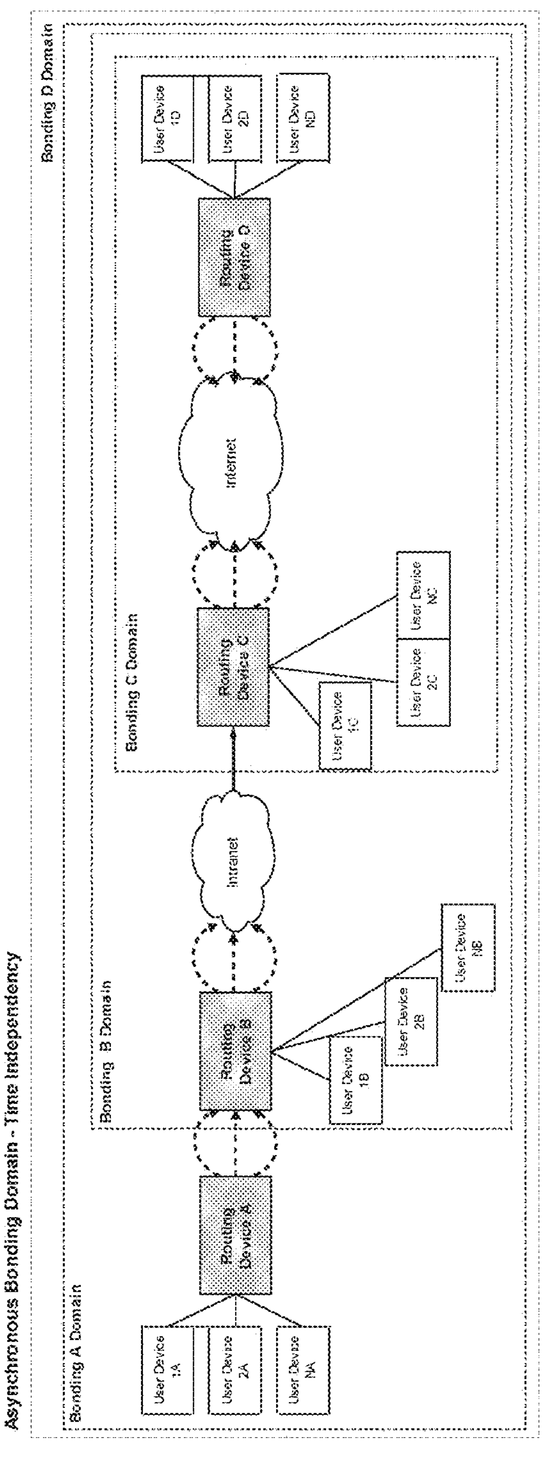
FIG. 7 is a network diagram of the invention's asynchronous bonding with time independency traits that extends beyond the internet domain from the routing device in a forwarding direction as shown by bonding A, bonding B, bonding C, and bonding D domains.

With regard to FIG. 7, the asynchronous bonding domain provides time independency between network hopping points from source to destination end-points. Bonding domain A covers the network points in the direction of routing devices A, B, C, and D. Bonding domain B covers the network points in the direction of routing devices B, C, and D. Bonding domain C covers the network points in the direction of routing devices C and D. Bonding domain D covers the network points in the direction of routing devices D, C, B and A. Bonding domain A is independent of bonding devices B, C and D when the data packets A are transmitted from network point A to D. Bonding domain B is independent of bonding devices C and D when data packets B are transmitted from network point B to D. With time independency bonding, data packet B has zero interference and impact to data packet A when both data packets need to reach network point D with bonding. The asynchronous method prevents synchronous network control at each network point when multi-paths are used without decreasing the performance of the data packet transmission along the network paths up to the destination end-points.

Figure 8:
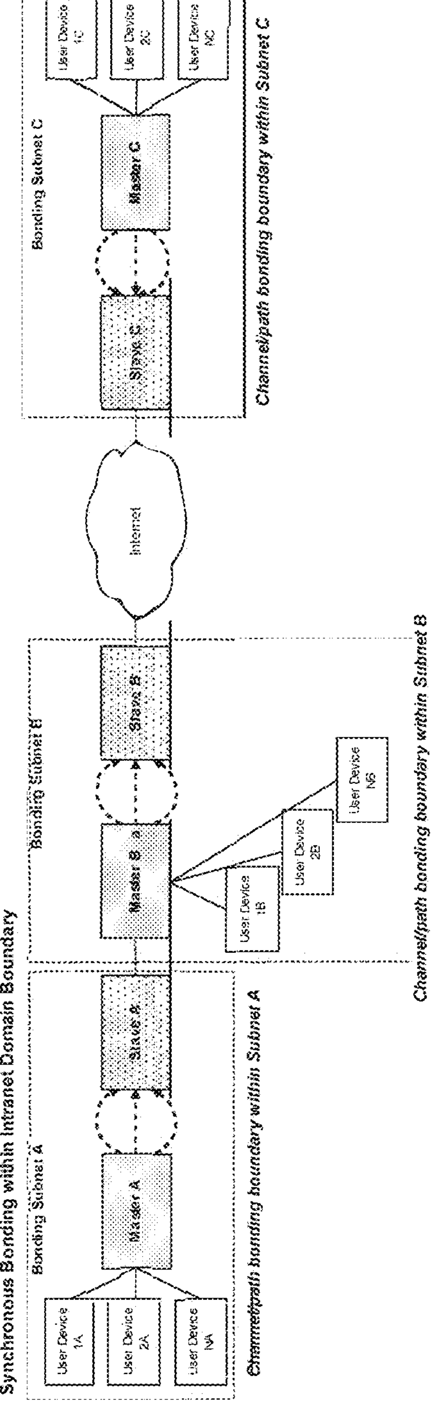
FIG. 8 is a network diagram of a conventional synchronous bonding subnet in which bonding capability is limited within the individual bonding subnet of the intranet domain.

In contrast, in the conventional system shown in FIG. 8, the synchronous bonding has time dependency between master and slave bonding devices within a network subnet. When both data packet A and B are transmitted to network point C, data packet B transmission can stop data packet A from passing through network subnet B until data packet B has been successfully transmitted to network point C hence introducing network latency that decreases the average data packet transmission speed from point A to C. Hence the synchronous method increases the latency for each cascaded network bonding added along the network path.

Figure 9A:
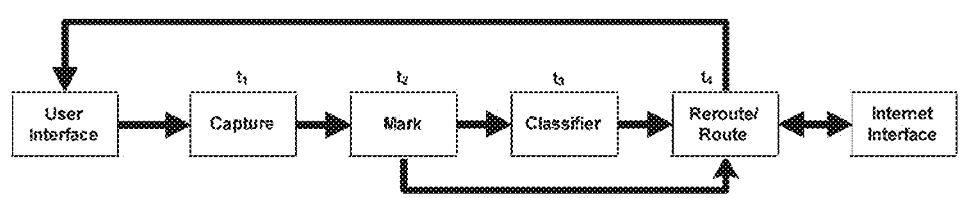
FIG. 9 is the schematic diagram that shows (a) the time that reflected a routing speed reduction to one-fourth from (b) normal routing speed.
Figure 9B:
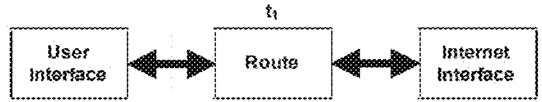

In FIG. 9*a*, the time sequences t1, t2, t3, and t4 show the response time required to complete the bonding processing concerning the data packet transmission speed without bonding. With bonding, the data packet transmission speed by the routing device hardware capability is slowed by a factor of 4. For example, if routing device performance without bonding shown in FIG. 9*b* has 10,000 Mbps performance then when bonding is used, the routing device can produce a bonding speed at 2500 Mbps shown in FIG. 9*a*. The capturing, marking, classifying, and re-routing of the data packets introduce time latency during bonding processing.

Figure 10A:
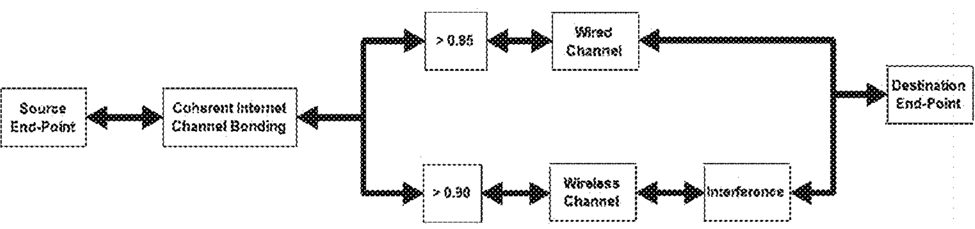
FIG. 10 is the schematic diagram that shows (a) overhead factors between 0.90 to 0.95 for wireless and wired channels in which the 0.95 overhead factor is reflected from the capturing, marking, and classifying of the data packet using the ethernet header (physical interface), IP header (routing information) and TCP header (routing responses) with a minimum 3.6% overhead from the header processing of (b) Ethernet, IP and TCP header composition of the total data packet size.
Figure 10B:
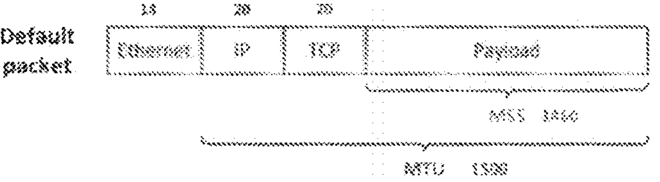

With reference to FIG. 10*a*, the overhead bonding factor is influenced by the channel medium. Wireless channels are heavily affected by interference as opposed to wired channels. Hence, wireless channel bonding has a higher overhead factor that reduces the total bonding output. In FIG. 10*b*, for wired channel bonding, the overhead factor is between 3.6% to 5% because of the processing time required for data packet header information which constitutes 3.6% of the total maximum data packet size. The 3.6% time loss is for capturing, marking, classifying, and re-routing processing in a sequence. An additional 1.4% is caused by the data packet time gap when a large data packet is split into smaller multiple data packets.

Figure 11:
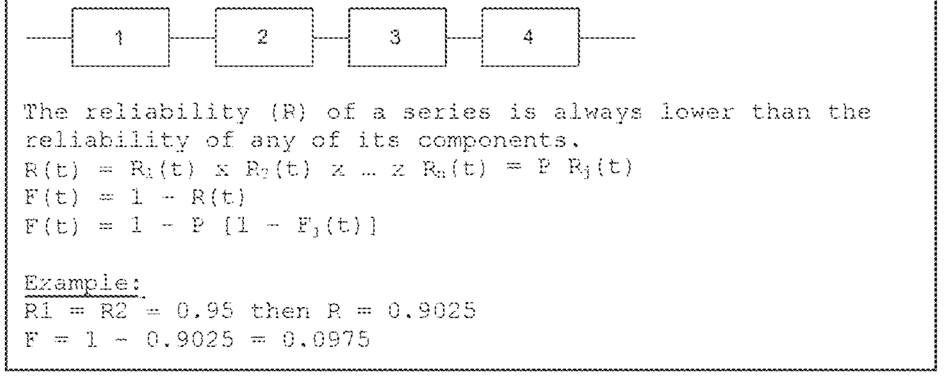
FIG. 11 is the reliability and failure calculation between serial and parallel systems in which the invention uses parallel multiple channels/paths to increase speed, achieve low latency and increase reliability
Figure 11:
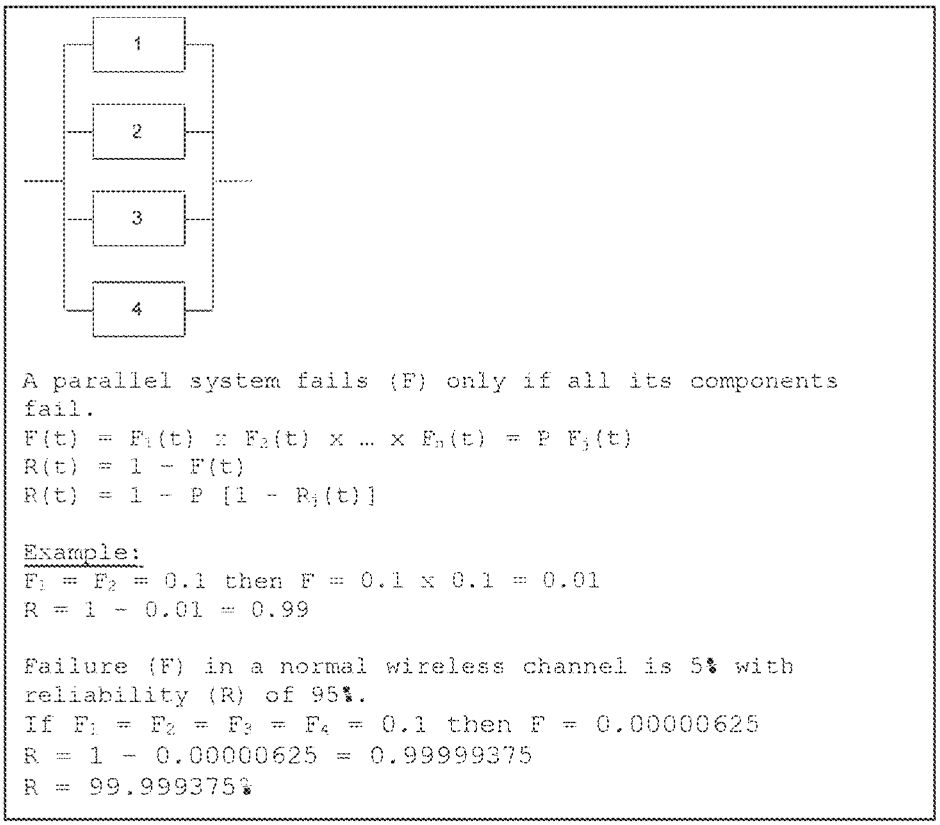

With reference to FIG. 11, the bonding of four parallel channels can achieve 99.999% reliability from single 99.5% channel reliability provide the mathematical evidence on how the bonding of parallel channels improves network performance in terms of speed and reliability.

Figure 12:
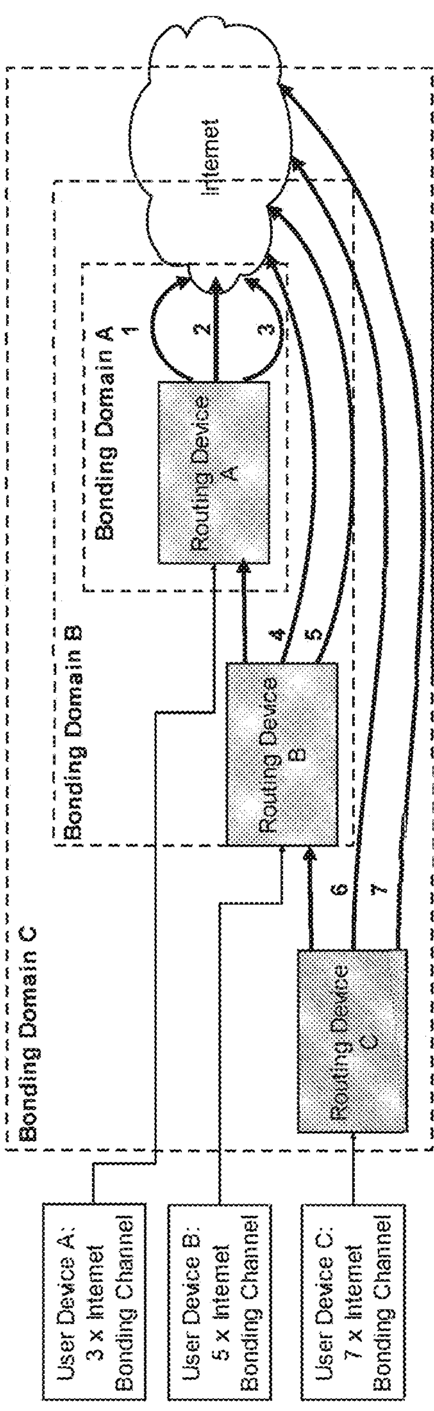

With reference to FIG. 12, the asynchronous method allows the solution to be cascaded to multiple host/routing devices to increase the number of bonding channels if the host/routing device has limited physical channels to work.

It will be appreciated by persons skilled in the art that the present invention may also include further additional modifications made to the system which does not affect the overall functioning of the system.

The invention claimed is:

1. A routing device for coherent internet network bonding, comprising:

Routing means for routing data packets from at least one source to at least one destination via two or more electronic communication channels and/or paths simultaneously;

characterized by monitoring means for tracking the condition of the channels and/or paths, and utilizing the channels and/or paths depending on at least one of latency, speed, or quality associated with each channel and/or path;

wherein the routing device determines optimum channels and/or paths to minimize latency across multiple network hopping points along internet transmission paths according to channel or path quality using routing cost quantity to reflect the quality of the channel and/or path such that, weights for the routing cost for a next channel and/or path are dynamically adjusted using latency and performance of previous channels and/or paths from source end-points to destination end-points performed by the routing device.

2. The routing device according to claim 1 wherein an asynchronous bonding method is initiated for both a downlink direction and an uplink direction.

3. The routing device according to claim 1 wherein a channel and/or path is utilized if the monitoring means determines that the condition thereof is good, and does not utilize it if the monitoring means determines that the condition thereof is bad.

4. The routing device according to claim 3 wherein a user can set thresholds for latency, speed, and/or quality to allow the monitoring means to determine if the condition of a channel or path is good or bad, and/or dynamically adjust the selection thereof.

5. The routing device according to claim 3 wherein the channels and/or paths channels/paths are monitored more frequently if the condition thereof is bad or reduced.

6. The routing device according to claim 1 wherein the monitoring means automatically detects active network channels and/or paths, and uses the available network channels simultaneously, without waiting for a network channel and/or path to reach its maximum capacity before using another randomly selected network channel or path that is not at capacity.

7. The routing device according to claim 1 wherein the routing means selects an optimum network configuration to split the data packets and route them over multiple internet channels and/or paths with zero packet loss using data packet header information from at least one source and/or destination.

8. The routing device according to claim 1 wherein the monitoring means calculates the routing cost based on latency, speed, and/or quality associated with each channel and/or path to determine an optimal route for data packets.

9. The routing device according to claim 8 wherein the monitoring means randomly selects additional channels and/or paths for determining if they have lower routing costs than those currently selected for routing.

10. The routing device according to claim 1 wherein the channels and/or paths are bonded between source and destination.

11. The routing device according to claim 10 wherein cascade connections with other routing devices are formed, each routing device having at least one physical routing interface, when there are more available channels than the number of physical routing interfaces, to increase the number of bonded channels.

12. The routing device according to claim 1 wherein the channels and/or paths channels/paths include a virtual tunnel via a Virtual Private Network domain.

* * * * *